United States Patent [19]

Kerr

[11] Patent Number: 4,484,119

[45] Date of Patent: Nov. 20, 1984

[54] FAIL-SAFE MACHINE CONTROL SYSTEM

[75] Inventor: Archie F. Kerr, Noblesville, Ind.

[73] Assignee: AT&T Technologies, Inc., New York, N.Y.

[21] Appl. No.: 508,702

[22] Filed: Jun. 28, 1983

[51] Int. Cl.³ .............................................. B26D 5/00
[52] U.S. Cl. .................................... 318/563; 318/560
[58] Field of Search ................. 318/563; 361/100, 181; 340/516

[56] References Cited

U.S. PATENT DOCUMENTS 3,886,413 5/1975 Dow et al. .......................... 361/181

Primary Examiner—J. V. Truhe
Assistant Examiner—Saul M. Bergmann
Attorney, Agent, or Firm—R. F. Kip, Jr.

[57] ABSTRACT

There is disclosed a control system for stopping a punch press and comprising first and second proximity sensor-amplifier combinations responsive to the cyclical movements of respective parts of the press to generate respective cyclical signals having respective recurrent digital waveforms which remain invariable while the press and such combinations operate normally. A device responds to a misfeed in the stock strip to change the waveform of the first signal. The two signals are fed to logic circuits which respond either to a change in waveform indicative of such fault or to a change in waveform indicative of malfunction of either combination to produce a signal for stopping the machine.

9 Claims, 6 Drawing Figures

LOGIC DIAGRAM FOR NOR CIRCUIT 70

| SIGNAL | BIT VALUE AT INPUT TO 50 | BIT VALUE AT INPUT TO 70 | BIT WORD | BIT VALUE AT OUTPUT FROM 70 |
|---|---|---|---|---|
| M | 0 | 1 | A | 0 |
| T | 1 | 0 | | |
| M | 1 | 0 | B | 0 |
| T | 0 | 1 | | |
| M | 0 | 1 | C | 0 |
| T | 0 | 1 | | |
| M | 1 | 0 | D | 1 |
| T | 1 | 0 | | |

FIG. 4

LOGIC DIAGRAM FOR CIRCUITS 71 AND 83

| FLIP-FLOP | INPUT TO 71 | BIT WORD | OUTPUT FROM 71 | OUTPUT FROM 83 |
|---|---|---|---|---|
| 80 | 0 | E | 0 | 1 |
| 81 | 1 | | | |
| 80 | 1 | F | 0 | 1 |
| 81 | 0 | | | |
| 80 | 0 | G | 1 | 0 |
| 81 | 0 | | | |
| 80 | 1 | H | 0 | 1 |
| 81 | 1 | | | |

FIG. 5

LOGIC DIAGRAM FOR NOR CIRCUIT 85

| SIGNAL FROM CIRCUIT | BIT VALUE AT INPUT TO 85 | BIT WORD | BIT VALUE AT OUTPUT FROM 85 | OUTPUT FROM 86 |
|---|---|---|---|---|
| 70 | 0 | I | 1 | 0 |
| 83 | 0 | | | |
| 70 | 0 | J | 0 | 1 |
| 83 | 1 | | | |
| 70 | 1 | K | 0 | 1 |
| 83 | 0 | | | |
| 70 | 1 | L | 0 | 1 |
| 83 | 1 | | | |

FIG. 6

FAIL-SAFE MACHINE CONTROL SYSTEM

TECHNICAL FIELD

This invention relates generally to systems for controlling the operation of a machine to stop such operation upon occurrence of a fault in such operation. More particularly, this invention relates to control systems of such sort which are fail-safe in the sense that the machine will be stopped moreover upon occurrence of a malfunction in the control system itself. While the invention will be described in terms of a control system for a punch press, the invention is also applicable to a wide variety of other kinds of machines.

BACKGROUND OF THE INVENTION

Various proposals have been made heretofore for stopping a machine in response to occurrence of an undesired condition. Thus, for example, U.S. Pat. No. 3,979,930 issued Sept. 14, 1976 in the name of Biester et al. discloses a punch press control system in which a first proximity sensor responds to rotation of the press drive shaft to generate a cyclical timing signal, second, third and fourth proximity sensors generate signals upon, respectively, appearance of a strip of stock at the press input and emergence from the press of, first, a punched product and, second, the strip skeleton, and all such signals are fed to logic circuitry which responds to them to eventually shut down the press when it runs out of strip stock.

The Biester et al. system, has, however, the disadvantage that, upon occurrence of a misfeed of the stock in the sense that the stock does not properly register with the die but nonetheless punched product emerges, the system will not stop the press. As another consideration, while it is not clear from the Biester et al. disclosure how the logic circuitry thereof works, it would appear that, in the event of malfunction of the "timing" proximity sensor so as to fail to produce a signal, the press would nonetheless continue to operate, i.e., would not fail safe.

SUMMARY OF THE INVENTION

In contrast to the foregoing, the invention in one of its aspects comprises a control system for a machine in which the control system comprises: first control means responsive to occurrence of a fault in the operation of the machine to produce an indication, second control means responsive to malfunctioning of the first control means to produce an indication, and third control means responsive to such indications to stop the machine upon the occurrence of either such fault in the machine's operation or such malfunctioning of such first control means.

As another aspect of the invention, the first and second control means may cross-check each other so that if either malfunctions, the machine will be stopped. As a further aspect of the invention, the machine may be of a type in which the operation performed thereby involves the synchronous cyclical movement of one or more parts thereof and in which the mentioned first and second control means respectively comprise first and second sensor means responsive to the positioning of such one or more parts in the course of such cyclical movement to generate signals for stopping the machine upon occurrence of a fault in operation or a malfunction of the control system.

BRIEF DESCRIPTION OF THE DRAWINGS

For a better understanding of the invention, reference is made to the following description of an exemplary embodiment thereof, and to the accompanying drawings wherein:

FIGS. 4, 5 and 6 are diagrams of some of the logic involved in the operation of the contol system of the FIG. 1 machine.

DESCRIPTION OF EMBODIMENT

Figure 1:
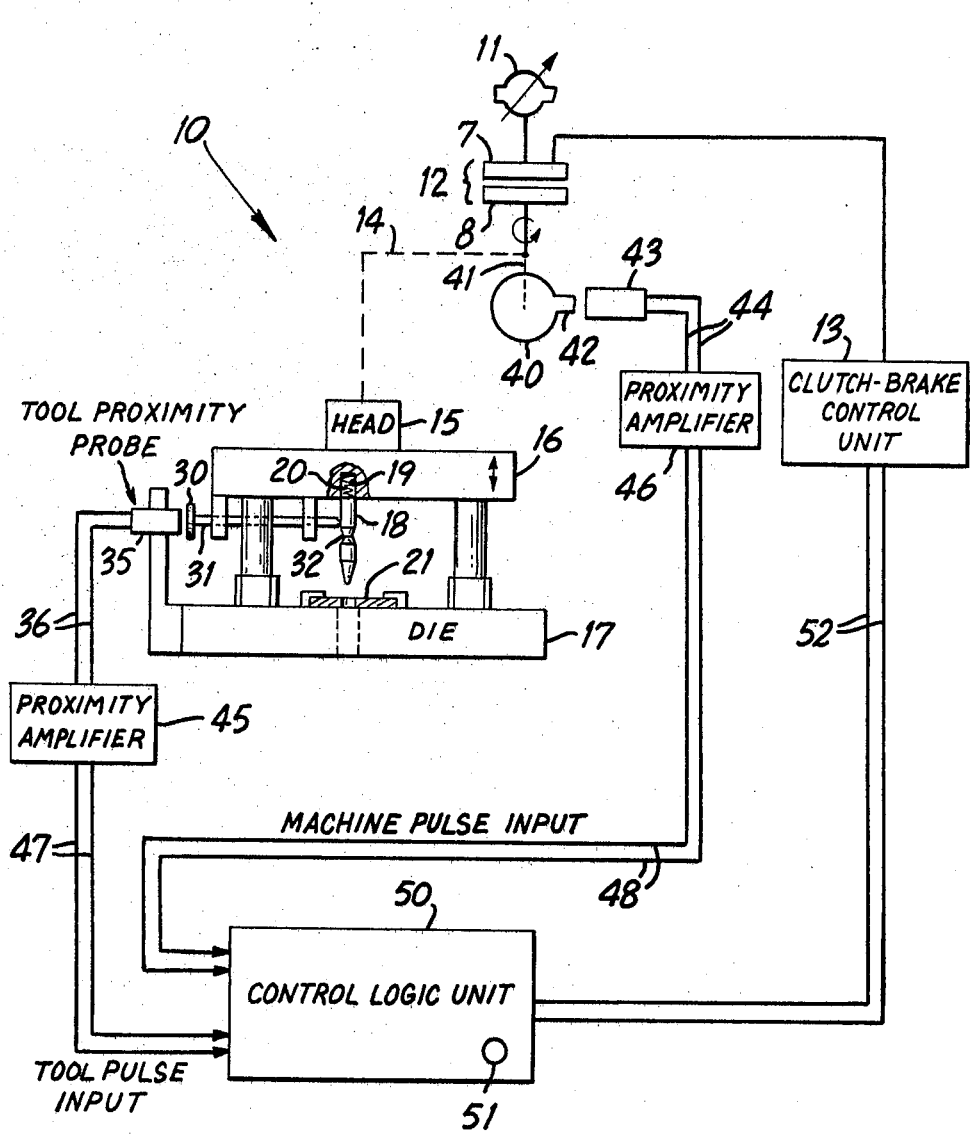
FIG. 1 is a schematic diagram of a punch press and of a control system therefor according to the invention.

Considering further the drawings, in FIG. 1 the reference numeral 10 designates a punch press comprising a variable speed motor 11 coupled to the input of a clutch-brake combination 12 controlled by a clutch-break control unit 13 so as to transmit and not transmit, respectively, the rotary motion from motor 11 when, respectively, the device 12 is rendered "closed" and "open" by control unit 13. Device 12 comprises a pair of clutch plates 7, 8 selectively engagable and disengagable under the control of unit 13 and, also, of a brake (not shown) which brakes clutch plate 8 when the two clutch plates are disengaged. Coupled to the output of device 12 is motion transmitting mechanism 14 for driving a press head 15 cyclically up and down with simple harmonic motion. Beneath head 15 and forming a part thereof there is mounted a punch holder 16 positioned above a die 17. The holder 16 acts as a carrier of a plurality of punches for punching parts out of stock. Holder 16 also carries a single misfeed detecting punch 18 received within a vertical guide channel 19 formed in the holder, a compression spring 20 being interposed between the back end of the punch and the back closing wall of the channel. A strip of stock material 21 is fed step-by-step over the dies 17 in a direction normal to the plane of FIG. 1 so as to pass beneath the punch 18. For each such full step, punch 18 will register with a pilot hole in the strip. If, however, in any step, the strip is advanced too far or too little such that there is a misfeed in the sense that the segment of strip to be punched does not properly register with the die, then there is a misfeed, and punch 18 will not register with a pilot hole.

A disk-like metal flag 30 is disposed to the left-hand side of holder 16 and is mounted on the left-hand end of a rod 31 carried by the holder. Rod 31 is axially slidable within its mounting, and the right-hand end of the rod bears against the stem of the punch 18. During normal operation of the press, the disk 30 and rod 31 remain in their shown leftward displaced positions. If, however, there is a misfeed of the stock material 21 over dies 17, punch 18 in its downward movement will not encounter, as usual, a pilot hole in the stock 21 but, instead, will engage with a solid portion of that stock. As a result, punch 18 will be driven up into holder 16 against the bias of compression spring 20. When this happens, a notch 32 formed in the stem of the punch will be raised to the level of rod 31 so as to leave room for rightward displacement of such rod, and the rod 31 and disk 30 will be displaced rightward under the action of a spring (not shown) until the right-hand end of the rod has entered into the notch.

Disposed outward of disk 30 is a head sensor in the form of a proximity probe 35 adapted by a capacitive or inductive electromagnetic field effect to produce a positive "tool" or "T" signal on leads 36 therefrom whenever the distance between the disk and the probe exceeds a predetermined minimum threshold distance. The signals so produced are as follows.

As, in the course of the cyclical movement of holder 16, to approach and attain its top position, the disk 30 passes probe 35 while moving upwardly and then continues further to cause its distance from the probe to exceed a minimum or threshold value, there will be generated on leads 36 from the probe the start of a positive "T" signal which is terminated when the holder and disk subsequently move downward to reduce the distance between the disk and the probe to less than such minimum value. Such "top" signal occurs at the 0° point in the simple harmonic motion of the punch holder 16. As the punch holder continues to move in its cycle, the start of which is marked by that 0° point, the probe-disk distance remains less than the minimum threshold distance so long as there is no misfeed, and, accordingly, the 180° point in such cycle will be characterized by the absence of any signal generated on leads 36. If, however, there has been such a misfeed, disk 30 will shift rightwardly, as described, to open up the distance between it and the probe to a value greater than such threshold value, and, in that case, a positive "misfeed" signal will be generated on lines 36 near such 180° point.

The signals heretofore described are generated herein by what is referred to as the "tool sensing" part or circuit. As another means of generating signals, a timing disk 40 is mounted on a shaft 41 coupled to the output of the clutch-brake device 12. Disk 40 has on it a salient finger 42 which moves in each revolution of the disk past a proximity probe 43 to generate by capacitive or inductive coupling with the probe a "machine" or "M" signal appearing on the output leads 44 from that probe.

The signals on leads 36 and 44 are supplied via proximity amplifiers 45 and 46 and respective leads 47 and 48 to a control logic unit 50 having thereon a reset buttom 51. The proximity probe units consisting of, respectively, probe 35, leads 46 and amplifier 45 and of probe 43, leads 44 and amplifier 46 are each available from Industrial Solid State Controls, 435 W. Philadelphia Street, York, Pa. 17405. The output of unit 50 appears on lead 52 connected to the pneumatic clutch-brake control unit 13 to control through the latter unit the condition of the clutch-brake device 12. That is, the output from unit 50 will either cause device 12 to remain "closed" so as to permit normal punching by press 10 of the stock material 21, or, alternatively, such output will cause device 12 to become "open" and thereby stop the action of the press.

Figure 2:
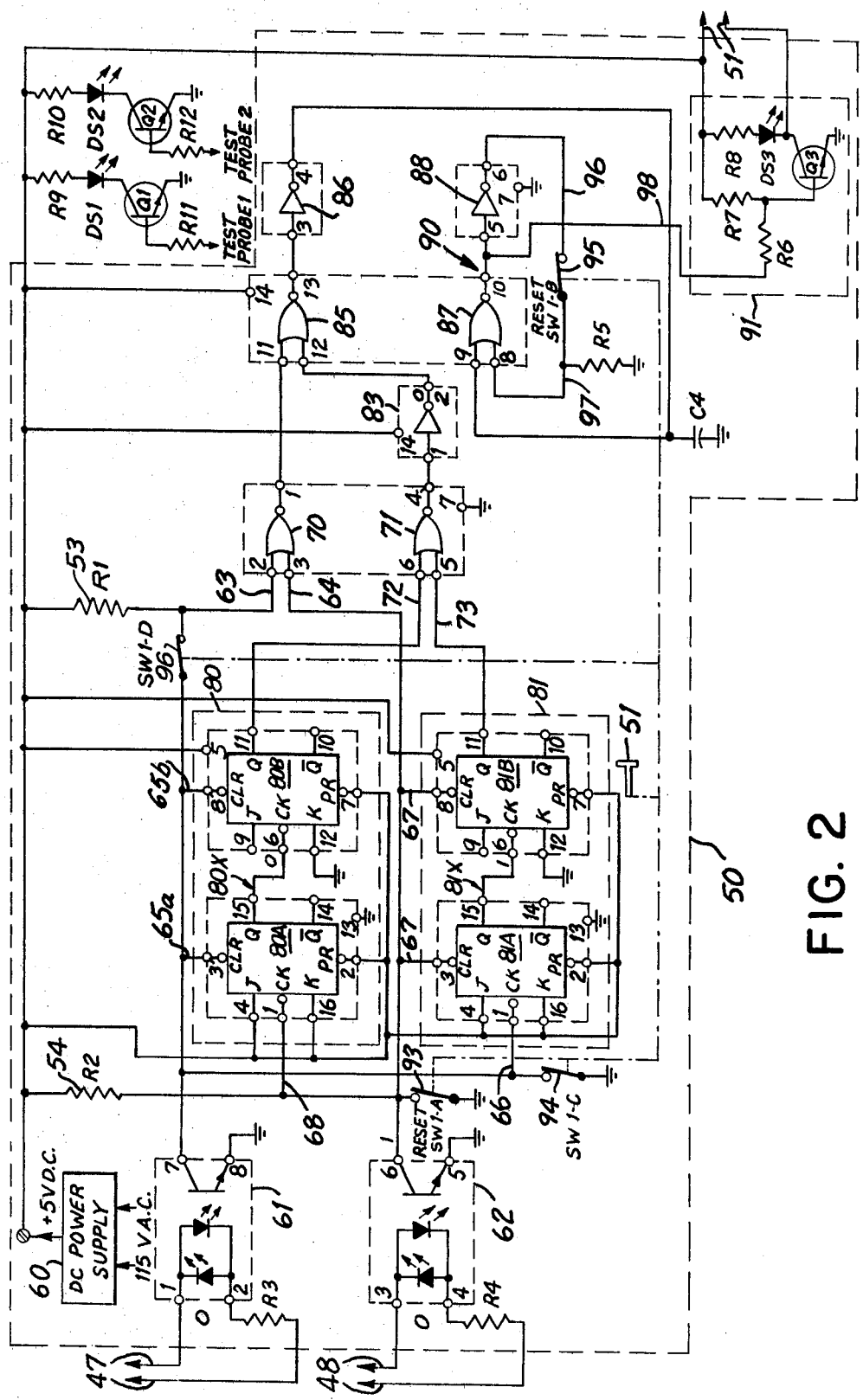
FIG. 2 is a schematic diagram of the control logic unit of the control system of FIG. 1.

Referring now to FIG. 2, which shows the circuits of the control logic unit 50, a power of +5 volts d.c. for these circuits is furnished by a power supply 60. The signals from, respectively, the proximity amplifiers 45 and 46 (FIG. 1) are fed by, respectively, leads 47 and 48 to unit 50 (FIG. 2) and, within that unit, to, respectively, the optic isolators 61, 62 which transmit such signals forward in the control logic unit while electrically isolating its +5 volts d.c. power from the higher voltage power used for the proximity amplifiers. As shown, the output sides of the isolators 61 and 62 are connected to power supply 60 through pull-up resistors 53 and 54, respectively. The signal output from isolator 61 is supplied via lead 63 to a NOR circuit 70 and via leads 65a and 65b to three JK flip-flops 80A, 80B and 81A. Similarly, the signal output from the isolator 62 is supplied via lead 64 to NOR circuit 70 and via leads 67 and 68 to three JK flip-flops 80A, 81A and 81B. The JK flip-flops 80A and 81A are adapted to assume either the "0" state or the "1" state and to be driven between these states by the signals from isolators 61, 62 in such manner that the two flip-flops are normally opposite in state at any time and normally each alternate in state in synchronism with the combined occurrence of signals from both isolators. That is, if, for example, initially the Q output of flip-flop 80A (lead 80X) is at "0" state and the Q output of flip-flop 81A (lead 81X) is at "1" state, the occurrence of a "T" signal transmitted from sensor 35 and through isolator 61 will set 80A to "1"and clear 81A to "0", the subsequent occurrence of an "M" signal transmitted from sensor 43 to and through isolator 62 will reset 80A to "0" and 81A to "1", and so on.

The Q outputs of the JK flip-flops 80B and 81B are, under normal conditions, at "0" and will only change to a "1" if two pulses in succession are received at input 66 or 68. For example, if two pulses are applied at input 68 and no pulse is applied at input 66, then the output from flip-flop 80B will become a "1". Correspondingly, if two pulses are applied at input 66 and no pulse is applied at input 68, then the output from flip-flop 81B will become a "1".

The outputs of JK flip-flops 80B and 81B are fed via respective leads 72 and 73 to a NOR circuit 71 the output of which is inverted by an invertor 83 and then supplied as one input to a NOR circuit 85 the other input of which is constituted of the output of NOR circuit 70. The output of NOR circuit 85 is inverted by an inverter 86 and is then fed as one input to a NOR circuit 87 the output of which is inverted by an inverter 88 and then fed back to NOR circuit 87 as the other input thereto such that circuits 87 and 88 together constitute a latching circuit 90. The output of latching circuit 90 is fed to a transistor drive circuit 91 the output of which is supplied via leads 51 to clutch-brake control unit 13 (FIG. 1) to produce in such unit the energization or de-energization, as the case may be, of the coils of relays (not shown) which operate to selectively establish and interrupt the mechanical coupling of the clutch plates of the device 12.

The control logic unit 50 includes (FIG. 2) reset switches 94 and 95 which are gang-linked to the reset button 51 of unit 50 and are adapted on pressing of such button to reset the circuits of such unit so that the press will operate to punch stock.

OPERATION

Figure 3:
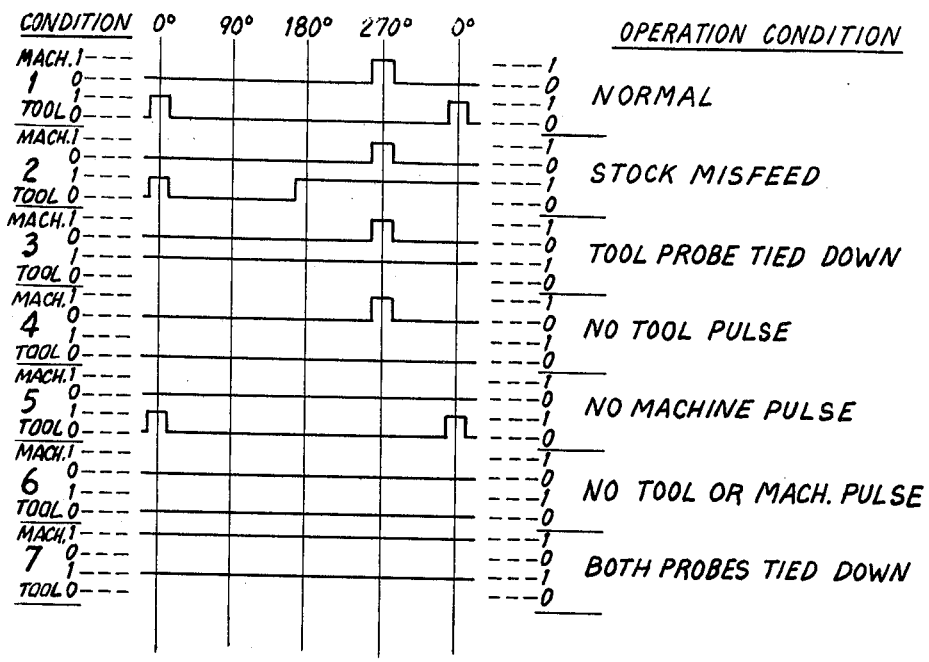
FIG. 3 is a set of timing diagrams illustrative of the operation of the control system of FIG. 1.

The operation of the described embodiment can best be understood by a consideration of the timing diagrams of FIG. 3 taken together with the other figures.

FIG. 3 represents vertically, one below the other, seven possible conditions which may occur in connection with the operation of the FIG. 1 press. The horizontal ordinate of the FIG. 3 diagrams represents the passage of time over slightly more than one press cycle which is considered to start and end at "0" degrees which is the top position of the press head 15 in the course of its cyclical movement. For each of the mentioned seven conditions there are upper and lower signal diagrams showing the level of the "M" and "T" signals from, respectively, the sensors 43 and 35 at any time during a press cycle.

To start or restart the FIG. 1 press, the reset button 51 of control logic unit 50 is pressed to reset the circuits thereof such that unit 50 sends to clutch-brake control unit 13 a signal causing such unit to produce mechanical coupling of the clutch plates of combination 12 and, thereby, driving of the press by the variable speed motor 11. During such driving, motion will be transmitted to the press head 15 to produce cyclical up and down simple harmonic movement thereof relative to die 17 and other stationary parts of the press. In each cycle of such movement during normal press operation, when the press head reaches close to its 180° position, the punches in holder 16 will contact a segment of stock strip 21 which has been advanced by conventional feeding means (not shown) to be in proper registration with die 17, and such punches will then punch out of such segment a shaped product. As the head moves past its 180° position, it will withdraw from the die and, before the head in its next cycle approaches near its 180° phase, a new segment of strip will be advanced over die 17 so as to be ready to be punched.

For such normal operation of the press which is designated in FIG. 3 as "condition 1," the proximity sensors 35 and 43 produce the signals represented by, respectively, the lower and upper signal level diagrams shown in FIG. 3 for that condition. As to the lower diagram, proximity probe 35 and proximity amplifier 45 are designed to operate so that, so long as flag 30 on holder 16 is less than a threshold distance from probe 35, the level of the signal output from amplifier 45 is zero, but when the distance between the probe and the flag exceeds that threshold, then the level of that signal output increases to a positive value. Further, the spacing between probe 35 and flag 30 is set so that, during normal press operations, such threshold is exceeded only during the brief interval in each movement cycle of press head when the head is approaching close to its top or 0° position, reaches that position, and then starts downward therefrom. It follows that the $T_1$ signal output from proximity amplifier 45 and appearing on leads 47 will have the waveform seen by unit 50 which is shown in FIG. 3 as the lower signal diagram for "condition 1" and which waveform can be described as being a digital variation of the $T_1$ signal between "0" and "1" in which "1" is attained only when head 15 is at or near its 0° position, and in which the signal is "0" for the remainder of the time in each cycle.

The proximity sensor 43 and amplifier 46 respond to the cyclical movement of flag finger 42 synchronous with that of head 15 to generate an $M_1$ signal which is produced in a manner similar to that by which the $T_1$ signal from elements 35 and 45 is produced excepting that, in order for the "1" value for the $M_1$ signal to appear for only a short interval in each movement cycle, it is necesary for such signal to be reversed in excursion direction on lead 48 as compared to the $T_1$ signal on leads 47. With such direction of excursion reversal, the waveform of the $M_1$ signal on leads 48 will be as shown in FIG. 3 on the upper line for "condition 1. That is, the waveform for such signal will be constituted of a digital variation between the values "0" and "1" with "1" occurring at or near the 270° position for head 15 and "0" value occurring the remainder of the time in each cycle.

The $T_1$ and $M_1$ signals produced during normal operation of the press are supplied via leads 47 and 48 to the control logic circuit 50 and, within it, to the optic isolators 61 which respond on their output sides to an increase in level in the input signals to cause more current to be drawn through the pull-up resistors 53, 54. That is, on their output sides, the optic isolators reverse the direction of excursion of the input signals thereto such that an input "0" becomes an output "1," and conversely. The output signals from the isolators 61, 62 are then fed as separate inputs to the NOR circuit 70. Taking into account the mentioned reversal of excursion direction at the isolators 61 and 62 and the logic characteristics of a NOR circuit, the logic diagram for that circuit is as shown in FIG. 4. Comparing that logic diagram to the FIG. 3 timing diagram, it will be seen that, when head 15 of the press is at its 0°, 90°, 180° and 270° positions, the bit words which will be fed to the inputs of the NOR circuit 70 will be A, C, C, B, respectively, and, for each of these bit words, the output of NOR circuit 70 will be zero.

While the outputs of the optic isolators 61 and 62 are being supplied to the NOR circuit 70, they are concurrently being supplied to the JK flip-flops 80A and 81A to drive them in alternation. For example, assume that initially JK flip-flop 80A is in "0" state and JK flip-flop 81A is in "1" state. The change in value of the T signal from the "0" to "1" (FIG. 3, condition 1) drives JK flip-flop 80A to the "1" state and JK flip-flop 81A to the "0" state, which states are held by the flip-flops until the change in value from "0" to "1" which occurs in the M signal at about 270° position for the press head 15. That latter change in value drives JK flip-flop 80A back to "0" state and JK flip-flop 81A back to "1", which states are then held by the JK flip-flops until the occurrence of the next change in value of the T signal at the 0° position of the next cycle. At that time, JK flip-flops 80A and 81A will be driven as before to, respectively, the "1" state and "0" state. In this manner, the two flip-flops will each cyclically be driven between its own two opposite states to have at any time a state opposite to that then being manifested by the other flip-flop, and such cyclical alternation of states of the two flip-flops to always be of respective opposite states will thus continue so long as the press control system is operating normally.

The signal outputs from the JK flip-flops 80B and 81B are fed via leads 72 and 73 to the two inputs of NOR circuit 71. The output of JK flip-flops 80B and 81B will remain at "0" signal level so long as the input signals to 80A and 81B are applied in an alternating fashion. The output of NOR circuit 71 is inverted to form an OR gate which will detect if either output from JK flip-flop 80B or JK flip-flop 81B has changed to a "1". If either of the "0" inputs from JK flip-flops 80B and 81B become a "1", the press will be stopped.

Taking these facts into account the logic diagram for circuits 71 and 83 is as shown in FIG. 5. Examining that figure, it will be evident that, so long as the JK flip-flops are driven by the T and M signals to alternate in state as described, the bit word "G" will appear at the inputs to NOR circuit 71 and, for such bit word, inverter 83 will supply a "0" signal to NOR circuit 85.

The logic diagram for NOR circuit 85 is shown by FIG. 6. From the foregoing description and FIG. 6 it follows that, during the normal operation of the press and press control system which is represented by "condition 1" in FIG. 3, NOR circuit 85 will see bit word I at its inputs and will accordingly produce a "1" signal at its outputs.

Such "1" signal is inverted by inverter circuit 86 to become a "0" signal which is supplied to the NOR circuit 87 of latching circuit 90. The other input (from inverter 88) to NOR circuit 87 is also "0". Hence, NOR circuit 87 produces at its output a "1" signal which is inverted by inverter 88 to a "0" signal fed back through lead 96, reset switch 95 and lead 97 to the lower input of NOR circuit 87. Concurrently the "1" signal at the output of NOR circuit 87 is fed via lead 98 to the transistor driver 91 the output of which is supplied via leads 52 to clutch-brake control unit 13 so as to cause that unit to maintain engaged the clutch plates 7 and 8 of the device 12. Such "1" signal on lead 98 is produced by flow of current in that lead in contrast to a "0" signal on lead 98 which would correspond to no current in that lead. Accordingly, the signal on lead 98 is a "fail-safe" signal in that, absent any current on lead 98 due to circuit failure or any other cause, clutch-brake control unit 13 will no longer maintain the clutch plates of combination 12 engaged, and the drive to press head 15 will be interrupted.

To summarize the foregoing, as long as the control logic unit 50 is supplied from the proximity amplifiers 45 and 46 with T and M signals which have the digital waveforms shown in FIG. 3 for "condition 1," the press will operate normally inasmuch as these waveforms, taken in combination, indicate that there is no misfeed of the strip stock and, further, that there is no malfunction of either of the proximity sensors 35 and 43 or of any of the circuits associated therewith.

The FIG. 3 timing diagrams represent by "condition 2" what occurs when, prior to the cycle represented, there has been a misfeed of stock strip such that, in that cycle, the punch 18 (FIG. 1) does not register with a pilot hole in stock strip 21 when the press head is at about 180° in the cycle so as to punch a shaped product out of the strip. Such misfeed might be caused, for example, by failure of the stock feed mechanism (not shown) to advance strip 21 a full step so that the next segment of strip to be punched is in proper registration with die 17.

Assuming there is such a misfeed, during the first part of the cycle from 0° to about 180°, the $T_2$ and $M_2$ signals on leads 47 and 48 are normal, i.e., are the same as the $T_1$ and $M_1$ signals produced for condition "1." When, however, the press head reaches near 180°, the punch 18 (FIG. 1) encounters, as earlier described, a solid portion of strip 21 rather than a pilot hole and so is driven up into channel 19. Responsively, rod 31 moves rightward and carries with it flag 30 so as to open the distance between flag 30 and probe 35 to greater than the mentioned threshold distance. As a result, just before the 180° point the signal produced by elements 35, 45 on leads 47 changes (FIG. 3) from "0" to "1" so that the inputs to logic unit 50 will be the same as they were at 0°. From FIG. 4, it will be evident that such change will have no effect on the output from NOR circuit 70 at this time. On the other hand, such change will cause an output "1" of NOR circuit 70 to occur at 260° when the signal on lead 64 from the probe 43 also changes to a "0", at this point. It follows that NOR circuit 85 will see (FIG. 6) bit word I at its inputs. In these circumstances, NOR circuit 85 will produce at its output a "0" signal inverted by circuit 86 to a "1" signal which is fed to one input of NOR circuit 87. That circuit responds to produce an output "0" inverted by circuit 88 to a "1" which is fed back to the other input of NOR circuit 87 so as to cause that circuit to hold a "0" at its output after the "1" signal thereto from circuit 86 has ended. The "0" output signal of NOR circuit 87 is fed by lead 98, to transistor driver 91 to produce on leads 52 a signal causing clutch-brake control unit 13 to open up the clutch plates of combination 12 and to apply the brake to the motion transmitting mechanism 14. The movement of press head 15 is thereby stopped and will remain stopped until whatever has caused the misfeed has been corrected, and the press has been reset to operate by pressing of the reset button 51.

The press control system disclosed herein has so far been described as being adapted to stop the operation of the press upon occurrence of a fault in such operation such as a misfeed of stock and, for that purpose, such control system might seem somewhat complicated. That system has, however, the great advantage that it will also stop the press upon occurrence of a malfunction in one or more of the elements of the control system itself so as, thereby, to provide improved "fail-safe" operation of the control system.

One such malfunction is the displacement of probe 35 leftward (FIG. 1), by its misadjustment or by tampering with it, until the probe is at a position at which the mentioned threshold distance between it and flag 30 is always exceeded. Such situation is represented in FIG. 3 by "condition 3" and, for that condition, it will be noted that the value of the "T" signal remains at "1" throughout the cycle of movement of the press head 15. Thus, when the press cycle reaches near 270°, it will be apparent from FIG. 4 that the NOR circuit 70 will see at its inputs the bit word D and it will be further apparent from FIGS. 5 and 6 and the description heretofore given that the presenting to NOR circuit 70 of bit word D will cause stoppage of the press.

The "condition 4" of FIG. 3 represents the case where probe 35 has been tampered with or otherwise misadjusted so that the threshold distance between the probe and flag 30 is never exceeded. In such case, the T signal will remain at "0" value throughout the cycle so as to have no "0" to "1" rise for driving the flip-flop 80A and resetting the flip-flop 81A. Absent such rise and whatever may have been the respective states of these flip-flops during the initial part of the cycle shown in FIG. 3 for "condition 4," when the cycle approaches 270°, the "0" to "1" pulse in the $M_4$ signal will cause the output Q of flip-flop 80A to go from the "0" to the "1" state, and that flip-flop will remain there until the next M pulse occurs (360° later). When the next M pulse is applied, flip-flop 80B will switch from "0" to "1". From this, it follows from the previous description that, upon such occurrence, the press will be stopped.

"Condition 5" of FIG. 3 represents the case where the elements 43 and 46 malfunction because probe 43 has been misadjusted to be too far away from finger 42 to produce any signal. "Condition 6" is a malfunction condition not adapted to be handled by the described control system.

"Condition 7" represents the case where both of probes 35 and 43 have been misadjusted to produce a "1" signal on, respectively, leads 47 and 48 throughout the press head cycle. In each of the cases of conditions 5 and 7, it will be evident from the signal waveform diagrams of FIG. 3 and the logic diagrams of FIGS. 4, 5 and 6 that the occurrence of the malfunction involved will result in stoppage of the press. Malfunctions of the control system other than those described above will also cause such a stoppage. Thus, for example, failure of the circuits of, respectively, proximity amplifiers 45 and 46 will produce, respectively, "condition 4" signal waveforms and "condition 5" signal waveforms to, in each case, result in press stoppage.

It will thus be seen that the use in the disclosed embodiment of two sensor means of which each, in effect, checks the other for malfunction and stops the machine when the other sensor means, in fact, does malfunction is an arrangement which renders the machine's control system of itself a fail-safe system.

The above-described embodiment being exemplary only, it will be understood that additions thereto, omissions therefrom and modifications thereof can be made without departing from the spirit of the invention. Accordingly, the invention is not to be considered as limited save as consonant with the recitals of the following claims.

What is claimed is:

1. A fail-safe control sysrem for a machine adapted by cyclical movement to cyclically perform an operation, said system comprising: first signal generator means responsive to such movement to produce a cyclical first signal having a recurrent waveform which remains invariable while said operation and the functioning of said means is normal, fault detector means responsive to a fault in the performance of said operation to change said waveform to thereby indicate said fault, second signal generator means responsive to such cyclical movement to produce a cyclical second signal having a recurrent waveform which remains invariable while the functioning of such means is normal, and control circuit means responsive to said first and second signals to compare their respective waveforms and adapted by such comparison to convert either said fault indicating change in said first signal's waveform or a change therein indicative of malfunction of said first signal generator means into a stop signal for stopping said machine.

2. A fail-safe control system according to claim 1 in which said machine is a punch press for punching out shaped products from strip stock fed stepwise into the machine, and in which the fault to which said detector means is responsive is a misfeed of said stock strip.

3. A fail-safe control system according to claim 1 in which said first and second signal generator means each comprise (a) a proximity sensor disposed adjacent to a respective cyclically moving part of said machine and adapted by interaction of said part with an electromagnetic field produced by said sensor to produce an electrical output which varies as a function of the distance between said sensor and part, and (b) a proximity amplifier responsive to said variable output to convert it into a signal having a recurrent digital waveform with "0" and "1" values when, respectively, said distance is on one side and other of a threshold value for such distance, said first and second signals each having accordingly such a digital waveform.

4. A fail-safe control system according to claim 3 in which said first and second signals are of the same frequency but out-of-phase, and in which said control circuit means comprises: a pair of JK flip-flops each driven by each of such signals to change in state between "0" and "1" and to normally have at any time a state opposite to that of the other JK flip-flop, and logic circuit means coupled to receive inputs from said JK flip-flops indicative of their respective states.

5. A fail-safe control system according to claim 4 in which said logic circuit means comprises: first logic circuits for comparing the respective states assumed at the same time by such flip-flops and for providing a signal of different values for different combinations of such states, second logic circuits for comparing the "0" and "1" values respectively manifested at the same time by the respective digital waveforms of said first and second signals and for producing a signal of different values for different combinations of such "0" and "1" values of such waveforms, and third logic circuits responsive to said signals produced by each of said first and second logic circuits for producing said stop signal.

6. A fail-safe control system according to claim 1 in which said control circuit means is responsive to a change in the second signal's waveform indicative of a malfunction of said second signal generator means to produce said stop signal.

7. A fail-safe control system for a machine adapted to repetitively perform an operation, said system comprising first signal generator means for producing during said operation a first signal for controlling said machine and having a waveform which remains invariable while the functioning of said first signal generator means remains normal, second signal generator means for producing during said operation a second signal for controlling said machine and having a waveform which remains invariable while the functioning of said second signal generator means remains normal, and control circuit means coupled to receive said first and second signals and responsive to a change in waveform of either said first signal or said second signal indicative of a malfunction of the associated signal generator means to produce for either such change a stop signal for stopping said machine.

8. A fail-safe control system according to claim 7 in which each of said first and second signals is a cyclical signal having a recurrent waveform, said first and second signals are of the same frequency but out-of-phase, and in which said control circuit means comprises: a pair of JK flip-flops driven by each of said signals to change in state between "0" and "1" and to normally have at any time a state opposite to that of the other JK flip-flop, and logic circuit means coupled to receive inputs from said flip-flops indicative of their respective states.

9. A fail-safe control system according to claim 7 which further comprises fault detector means responsive to a fault in the performance of said machine's operation to provide an indication of said fault, and in which said control circuit means is responsive to said fault indication to produce said stop signal.

* * * * *